Patented Jan. 22, 1952

2,583,173

UNITED STATES PATENT OFFICE 2,583,173

RADAR RECEIVER

Charles W. Hargens, Doylestown, Pa., assignor to Gilfillan Bros., Incorporated, Los Angeles, Calif., a corporation of California Application July 29, 1946, Serial No. 686,906

1 Claim. (Cl. 343—13)

This invention relates to radar equipment, and in particular to a method and apparatus for controlling the brightness and/or size of an image of a distant object on the indicator in accordance with the distance of such object from such radar equipment.

In order to obtain an accurate representation on an indicator, such as a cathode ray tube, of the distance and/or relative size of an object scanned by radar equipment, it is desirable that the image of such object appear of substantially equal brightness and size regardless of the relative position of such object with respect to the radar equipment; that is, in radar equipment, such as P. P. I. (plan position indicators) or E. P. I. (expanded partial plan position indicator). For example, for obtaining a visual representation of the flight of an aircraft in so called G. C. A. (ground controlled approach) systems, it is desirable that the image of such aircraft remain constant in size and shape regardless of its actual position in space with respect to its landing strip. In such case an observer may accurately track the position of the aircraft and thus cause accurate information to be conveyed to the aircraft pilot in landing the aircraft.

Heretofore these desiderata were not obtainable largely because of the fact that the echo wave resulting from reflection of a transmitted pulse from the aircraft varies in intensity in accordance with the distance of such object from the receiver arranged to receive such echoes. In such case the received echo wave is of relatively large intensity when the aircraft is close and is of relatively smaller intensity when the aircraft is at a more remote point. As a consequence the image of the aircraft becomes larger and larger as it approaches its landing strip in the vicinity of the location of certain G. C. A. radar equipment. Such enlarged images become annoying and their exact midpoint with respect to the landing strip is more and more difficult to ascertain. If the indicator and radar receiver were adjusted to provide a point image of the aircraft when it is near the landing strip, an image of the aircraft would be difficult to see when it is at a point remote therefrom and, conversely, if the indicator and radar receiver were adjusted to provide a point image of the aircraft when it is at a point remote from the aircraft when it is at a point remote from the landing strip, the image is too large when the aircraft is adjacent the landing strip.

It is therefore an object of the present invention to provide a new method and apparatus for achieving these desiderata.

In particular, an object of the present invention is to provide a new method and apparatus for maintaining the size and shape of an image of an object scanned by radar waves substantially constant regardless of its position within the range of the radar equipment.

Although the present invention has particular applicability to G. C. A. systems for tracking the flight of aircraft with respect to a landing strip, it is likewise applicable to other radar systems employing indicators other than P. P. I. and E. P. I. indicators, such as indicators of the so-called "A" type, "B" type, etc.

The present invention has particular applicability in radar systems using the "A" type of indication in which only the distance of an object is indicated in the form of "pips" above a base line which is more or less obscured due to reflections from close objects. When the present invention is incorporated in such systems, the so-called "grass" is removed from the base line and it becomes more clearly defined; that is, the high intensity reflections or echoes from relatively close objects are decreased in intensity to thereby eliminate a substantial portion of the "grass."

It is therefore another specific object of the present invention to provide a so-called sensitivity time control applicable on all types of radar equipment known today, the control being of such nature as to maintain the intensity of the image of both close and distant objects substantially the same.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

Figure 1:
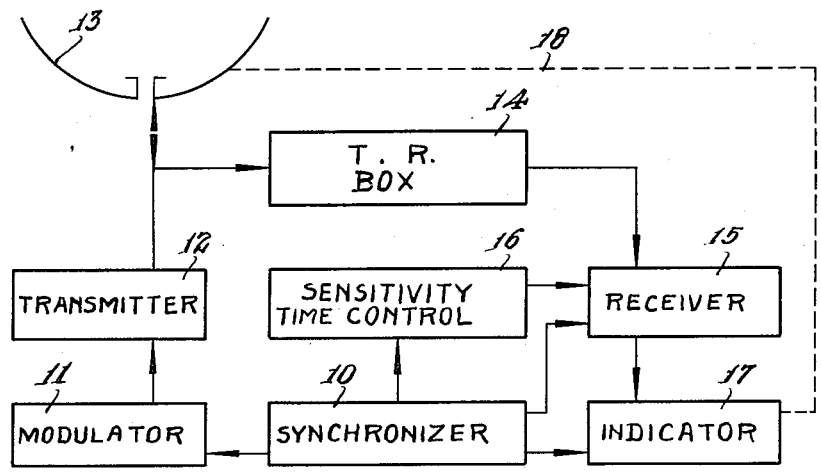
Figure 1 shows a schematic diagram of a radar system and apparatus incorporating the present invention.

The radar system shown in Figure 1 includes a central timing and synchronizing unit or synchronizer 10, a modulator 11, a transmitting oscillator or transmitter 12, an antenna system 13, a transmit-receiver switch or TR box 14, a receiver 15, a sensitivity time control 16, an electrical measuring device or indicator 17 and in systems such as the P. P. I. and E. P. I., a synchronous tie 18 between the antenna system 13 and indicator 17. Such synchronous tie 18 may be either electrical or mechanical in nature and may, in fact, be omitted in systems using the "A" type of indicator.

The synchronizer or central timing and synchronizing unit 10 generates a pulse which is applied to the modulator 11 and is also applied to the electrical time measuring circuit of the indicator 17 to start such electrical time measuring circuit. Also, in accordance with the present invention, a pulse from synchronizer 10 is applied to the sensitivity time control 16 whose output circuit is connected to the receiver 15 to control the intensity of signals translated by the receiver 15. In, for example, a G. C. A. system, other voltage wave forms generated in the synchronizer 10 are applied to the indicator 17 for range calibration gating and blanking of the indicator between sweeps. The output of the modulator 11, preferably of the klystron or velocity-modulated type, is applied to the transmitter 12. It is essential that the timing circuit in the indicator 17 be started at the same instant that the transmitter 12 is pulsed with pulses from modulator 11 so that the elapsed time between the pulses applied from transmitter 12 to antenna 13 and the returning echo from the target may be measured accurately.

The modulator 11 is arranged to receive sharp trigger pulses from the synchronizer 10. These trigger pulses start the action of a circuit in the modulator 11 that has a precisely regulated period of operation. This modulator stage 11, often referred to as the transmitter driver, has its output applied to the transmitter 12, in the form of a square wave pulse of short duration. The transmitting oscillator 12 is of conventional type, preferably of the magnetron type to which is applied pulses from the modulator 11 to thereby effect a series of ultra high frequency oscillations which are fed to the antenna system 13.

The antenna system 13 is preferably connected to the output circuit of the transmitter 12 through a coaxial transmission line, or at higher frequencies, through a hollow wave guide. Since energy from the transmitter 12 to the antenna system 13 is conveyed in the form of recurrent pulses, the same antenna system is also used for the reception of the reflected pulses or echoes from a target during the time interval between pulses from transmitter 12 to antenna system 13.

As shown in Figure 1, the antenna system 13 may comprise a plurality of dipoles or half wave radiators located at the focus of a parabolic reflector to produce a narrow beam of radiation. Such beam is made to scan the area to be covered in a definite pattern, either electrically or mechanicaly; that is, in accordance with conventional practice a scanning beam may be projected from the antenna system 13 either by mechanically moving the antenna system 13 or electrically by supplying energy of predetermined phase to the antenna system.

The TR box 14 serves to block the transmission of high powered pulses in the output circuit of the transmitter 12 from the input circuit or receiver 15. This TR box 14 is considered essential because the antenna system 13 is used by both the transmitter 12 and receiver 15; that is, the TR box 14 functions as an electronic switching device to block the high powered pulses in the output circuit of transmitter 12 from the receiver 15 and to allow the relatively weak echo signals received on the antenna system 13 to pass through to the receiver circuit.

The radar receiver 15 incorporating the sensitivity time control 16 is preferably of the superheterodyne type. Usually in radar receivers of the type employed, in G. C. A. systems, the local oscillator of the superheterodyne receiver produces a radio frequency signal which is combined or mixed in a crystal detector with the incoming echo signals to produce an intermediate frequency signal having a mean frequency equal to the difference between the R. F. frequency of the oscillator and the frequency of oscillations comprising the echo signal.

Figure 2:
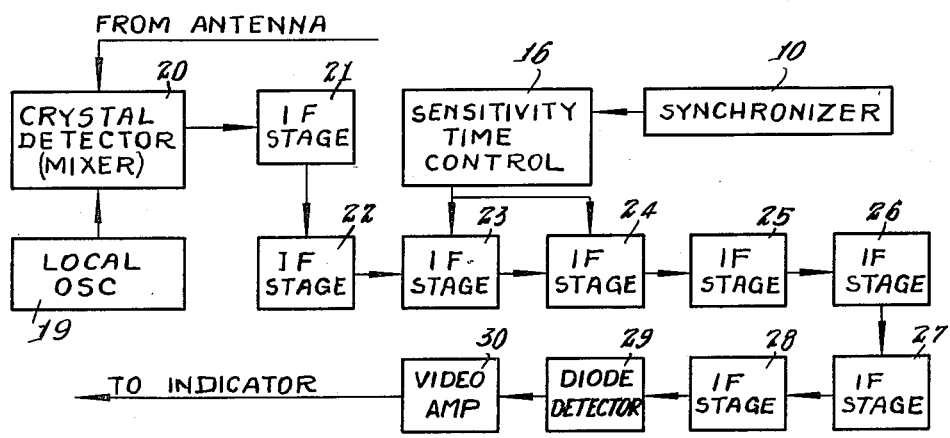
Figure 2 shows a schematic diagram of certain components incorporated in the apparatus of Figure 1.
Figure 3:
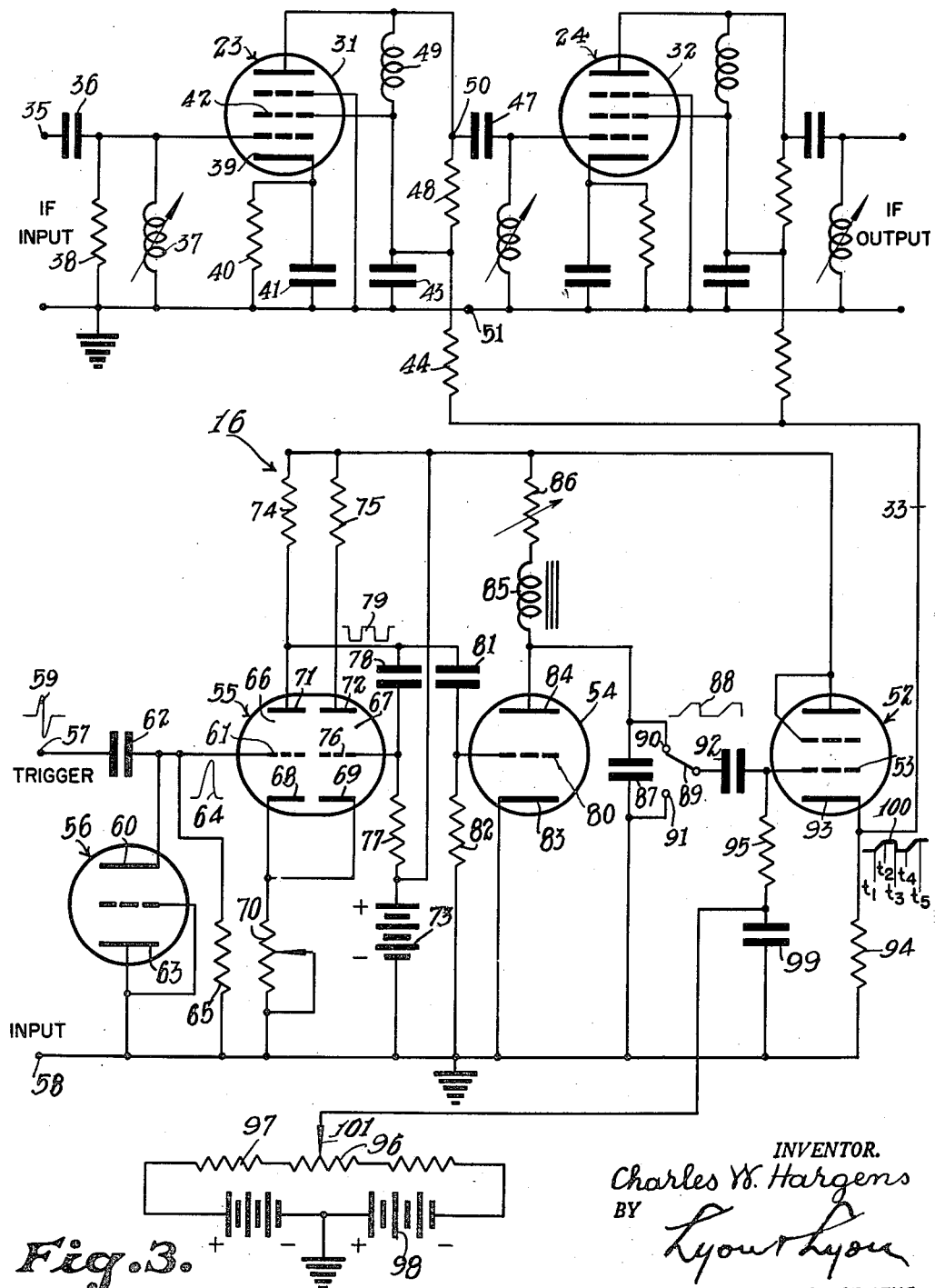
Figure 3 is a schematic circuit diagram of elements incorporated in the apparatus of Figure 1.

In Figure 2 the local oscillator 19, crystal detector 20 and the first stages of intermediate frequency amplification 21, 22 are placed very close physically to the antenna system 13 so as to prevent undue attenuation of the echo signal in its passage from the antenna system to the receiver proper. From such first stages 21, 22 of I. F. amplification or pre-amplifier stages, the modified signal of intermediate frequency is applied to a series of cascade connected intermediate frequency amplifying stages 23, 24, 25, 26, 27 and 28 in that order.

The output of the last I. F. amplifier stage 28 is applied to a second detector or diode detector 29, whose output is a video signal similar to the audio output signal of an ordinary superheterodyne type of household radio receiver. This video signal is applied to the video amplifier 30 wherein it is amplified and applied to the indicator 17. The indicator 17 may comprise a cathode ray tube having an accelerating grid arranged to intensity modulate the cathode ray beam in accordance with the intensity of video signals in the output circuit of the video amplifier 30.

In such case the light intensity resulting from impingement of the cathode ray beam on the fluorescent coating of the cathode ray tube is controlled by controlling the intensity of signals passing through the intermediate frequency amplifier stages 23 and 24, and it is evident that the same result may be obtained by controlling the intensity of the signals translated through any one or more of the other stages of the superheterodyne type of receiver.

The intensity of signals translated through the I. F. stages 23 and 24 is suitably controlled by the sensitivity time control 16 whose operation depends upon pulses received from the synchronizer 10.

The I. F. stages 23, 24 are connected in cascade such that the degree of amplification produced in each of such stages is made responsive to the potential of electrodes in an electron discharge device in each one of such stages. Preferably the amplification of stages 23 and 24 is controlled by controlling the potential of the anode and screen grid electrodes in a pentode type of tube 31, 32, respectively, in stages 23 and 24.

The amplification in devices 31 and 32 is controlled by controlling the potential on the lead 33, which serves to conduct space current to the screen grid and anode circuits of the devices 31 and 32 in a manner described later.

Since the two amplifier stages 23 and 24 are identical in construction, a detailed description of stage 23 and the manner in which stage 23 is connected to stage 24 will suffice to describe stage 24.

In stage 23 the main control grid of electron discharge device 31 is connected to the ungrounded input terminal 35 through coupling condenser 36 which is tuned to the mid-frequency of intermediate frequency signals by means of the variable inductance 37 which has its ungrounded terminal connected to such grid. Resistance 38 connected between ground and grid 34 serves to introduce sufficient loss in the tuned circuit 36, 37 to thereby assure broad band amplification in device 31. The cathode 39 of device 31 is connected to ground through a conventional self-biasing resistance 40 and bypass condenser 41 connected in shunt to resistor 40.

The screen grid 42 is maintained substantially at ground potential for currents of intermediate frequency by means of the bypass condenser 43 having its ungrounded terminal connected to screen grid 42.

Continuous space current for the screen grid 42 is obtained by connecting screen grid 42 to the lead 33 of variable continuous potential through the voltage dropping resistance 44. The anode or plate of device 31 is coupled directly to the main control grid of the succeeding device 32 through the coupling condenser 47 corresponding to the coupling condenser 36. Space current for the anode of device 31 is obtained through two paths extending from the high potential lead 33 to the anode of device 31, one of such parallel circuits including serially connected resistances 44 and 48 while the other one of such circuits includes resistance 44 and inductance coil 49, the resistance 48 and inductance coil 49 being connected in shunt between the anode of device 31 and screen grid 42. In such case, the voltage of intermediate frequency appearing across the parallel circuit 48, 49 is applied to the input terminals 50, 51 of the succeeding amplifier stage 24.

It is thus evident that the total space current in devices 31 and 32 may be controlled by controlling the potential of lead 33 in order to control the intensity of signals passing through stages 23, 24 in accordance with the present invention.

The potential of lead 33 is controlled by connecting it in the output circuit of a so called "saw tooth" voltage generator including devices 54 and 55; that is, lead 33 is connected to the sensitivity time control having the reference numeral 16 in Figure 1 and comprising specifically the so called negative clipper discharge device 56, the multivibrator stage 55, the so called switching device 54 and the cathode follower stage 52. The input terminals 57, 58 of the sensitivity time control are connected to the synchronizer 10 to receive therefrom a series of recurrent pulses having the wave shape indicated by the wave shape 59 having both positive and negative peaks. The negative peak of such wave form 59 is "clipped" by means of the diode type clipper 56 having its cathode 60 connected not only to the main control grid 61 of device 55, but also to the input terminal 57 through the coupling condenser 62 while the anode 63 of device 56 is connected to ground.

In such case the wave form 59 applied in the input circuit of device 56 appears in the output circuit of device 56 as a wave form 64 having only a positive peak. Such positive peak voltage form 64 is applied across the resistance 65 connected between the main control grid 61 and ground.

The multivibrator 55 is of conventional nature and operates in conventional manner. It includes a pair of triode stages 66, 67. The cathodes 68, 69 of both stages are connected to ground through the common adjustable bias resistor 70 while the corresponding anodes 71 and 72 are each connected to the positive ungrounded terminal of voltage source 73 through resistance 74 and 75, respectively. The main control grid 76 of device 67 is maintained at positive potential by connecting it to the positive ungrounded terminal of voltage source 73 through the resistance 77. Anode 71 is connected directly to the grid 76 through condenser 78 to provide coupling therebetween.

Thus, in accordance with well understood principles, a wave form 64 applied to the input of the multivibrator stage 55 appears in modified form at the anode 71 as a square wave form 79. Such square wave form 79 is applied directly to the main control grid 80 of device 54 through the coupling condenser 81 to provide a corresponding voltage across the input resistance 82 having one of its terminals connected to the grounded cathode 83 of device 54 and having its other terminal connected to grid 80. Space current for the device 54 is obtained by connecting its anode 84 to the positive terminal of voltage source 73 through the inductance coil 85 and adjustable resistance 86.

The anode 84 is connected to ground through the condenser 87 so as to develop thereacross a voltage having the wave form 88; that is, the serial circuit including resistance 86 and condenser 87 has a time constant such that a voltage having the form 79 applied to the input terminals of device 54 is modified to have the wave form 88 in the output circuit of device 54.

Inductance coil 85 serves to straighten the inclined or saw tooth line in the wave form 88. Such saw tooth voltage wave 88 may be applied to the main control grid 53 of the cathode follower 52 by maintaining the movable switch element 89 in engagement with the upper one of the pair of contacts 90, 91, contact 90 being connected to anode 84 while contact 91 is grounded.

It is thus evident that when the switch element 89 is in the position shown in engagement with contact 90 the voltage wave 88 is applied to the main control grid 53 through serially connected coupling condenser 92. The main control grid 53 may be made insensitive to voltage variations in output circuit of device 54 by maintaining the switch element 89 in contact with the lower grounded contact 91.

The cathode follower 52 operates in conventional manner and has its cathode 93 at a potential elevated above ground due to space current flowing through resistance 94 connected between cathode 93 and ground. The anode of cathode follower 52 is connected directly to the positive ungrounded terminal of voltage source 73.

Grid 53 is connected through resistance 95 to the point 96 of variable direct current potential, point 96 being on the variable potentiometer 97 having its opposite terminals connected to opposite terminals of voltage source 98 which has its electrical center grounded. Bypass condenser 99 connected between point 96 and ground serves to bypass high frequency currents away from the potentiometer 97 and voltage source 98.

It is thus evident that a voltage having the wave form 88 applied to the input terminals of cathode follower 52 will produce a relatively large change in the potential of lead 33 connected to cathode 93 and yet maintain a corresponding similar voltage variation 100 in the output circuit of the cathode follower 52.

Since the voltage having the wave form 100 applied to lead 33 for changing the amplification in stages 23, 24 has its origin in the synchronizer 10, which simultaneously causes the radiation of pulses in predetermined timed relationship, it is evident that the amplifications in devices 23 and 24 will vary in synchronism with the emission of pulses.

The apparatus is so adjusted that within the time interval $t_3$—$t_4$ indicated on wave form 100, a pulse of radiation is transmitted from the antenna 13, and in the time interval $t_1$—$t_2$ or $t_4$—$t_5$ the receiver is in a condition to receive echoes resulting from the transmission of such pulses.

Since the amplification of stages 23, 24 increases with an increase in the potential of lead 33 the amplification in stages 23 and 24 increases progressively in the time interval $t_1$—$t_2$ and $t_4$—$t_5$, during which time interval the receiver "waits" for the reception of echoes. In case the echo comes from a relatively close body, its time of transition is relatively small and, accordingly, it will be amplified in a relatively small degree but when the echo is from a more distant object its time of transition is relatively larger and, accordingly, it will be amplified in a relatively larger degree.

Such selective amplification of echoes from close and distant objects is very desirable since it is a well-known fact that an echo reflected from a body located relatively close to the radar apparatus is received with much larger intensity than if the same body were located at a more distant point, the variation of the intensity of received echoes varying inversely with the fourth power of the distance from the object to the radar equipment.

It is thus evident that with the apparatus described, images of objects located at both close and distant points will appear with substantially the same intensity on the fluorescent screen of the cathode ray type of indicator.

While the sensitivity time control described above is automatic in operation when the switch element 89 is maintained in contact with the contact 90, the sensitivity control may be adjusted manually when the switch element 89 is in contact with the contact 91. In such case, when the switch element 89 is grounded, the voltage of lead 33 and, accordingly, the amplification in devices 23 and 24 may be adjusted manually by manual adjustment of the variable tap 101 of the variable potentiometer 97.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

In a system of the character described, single antenna means, means including said single antenna means for transmitting pulses to a target, the relative distance of which from said transmitting means may vary, trigger generating means coupled to said transmitting means to effect periodic operation of the same, receiving means including at least one stage of amplification for receiving from said target related echoes having amplitudes varying with the distance between said receiving means and said target, a single transmit-receive switch coupling said receiving means to said antenna means and functioning to block high powered pulses generated in said transmitting means from the receiving means while yet allowing relatively weak echoes from said antenna means to pass to said receiving means, said one stage of amplification including an electron discharge device having a positive gain controlling electrode, a cathode follower stage including a second electron discharge device having an anode control grid and cathode, said second discharge device having its cathode connected to said positive electrode, said cathode follower stage having a cathode load resistor connected to said cathode, a continuous voltage source serially connected with said resistor cathode and anode whereby said positive electrode is normally maintained, in a quiescent stage, at a predetermined continuous potential, sawtooth generating means operated in timed relationship with generation of said pulses, means coupling the output of said sawtooth generating means to the control grid of said cathode follower stage, said sawtooth generating means including a one shot multivibrator stage having its input circuit coupled to said trigger generating means, an amplifier stage coupling said multivibrator stage to said control grid, said amplifying stage including a third electron discharge device having its control grid coupled to said multivibrator stage and its anode coupled to the control grid of said cathode follower stage, means for supplying space current to said third electron discharge device, the last mentioned means including an inductance and a resistance serially connected with the anode of said third discharge device.

CHARLES W. HARGENS.

REFERENCES CITED

The following references are of record in the file of this patent:

UNITED STATES PATENTS

| Number | Name | Date |
| --- | --- | --- |
| 2,167,492 | Sproule | July 25, 1939 |
| 2,185,612 | Trevor | Jan. 2, 1940 |
| 2,407,898 | Norgaard | Sept. 17, 1946 |
| 2,408,078 | Labin | Sept. 24, 1946 |
| 2,410,641 | Evans | Nov. 5, 1946 |
| 2,412,703 | Wolff | Dec. 17, 1946 |
| 2,416,895 | Bartelink | Mar. 4, 1947 |
| 2,422,334 | Bedford | June 17, 1947 |
| 2,427,523 | Dalberg et al. | Sept. 16, 1947 |
| 2,429,623 | Hoisington | Oct. 28, 1947 |
| 2,433,838 | Elie et al. | Jan. 6, 1948 |
| 2,439,656 | Hauz | Apr. 13, 1948 |
| 2,444,721 | Blaisdell | July 6, 1948 |
| 2,449,985 | Gloess | Sept. 28, 1948 |
| 2,456,952 | Kluender | Dec. 21, 1948 |
| 2,498,381 | Smith | Feb. 21, 1950 |